United States Patent [19]
Daly

[11] Patent Number: 5,453,236
[45] Date of Patent: Sep. 26, 1995

[54] METHOD OF MOLDING A LOAD BEARING PALLET FROM RECYCLED MATERIALS

[75] Inventor: Lewis J. Daly, Fayetteville, N.Y.

[73] Assignee: Composite Design International, Inc., Syracuse, N.Y.

[21] Appl. No.: 192,999

[22] Filed: Feb. 8, 1994

[51] Int. Cl.$^6$ ............... B27N 3/08; B27N 5/00; B27N 7/00
[52] U.S. Cl. ............... 264/128; 264/37; 264/71; 264/122; 264/DIG. 69
[58] Field of Search ............... 264/37, 69, 71, 264/109, 122, 128, 239, DIG. 7, DIG. 69; 428/292, 425.3

[56] References Cited

U.S. PATENT DOCUMENTS

| | | | |
|---|---|---|---|
| 3,717,922 | 2/1973 | Witkowski | 264/46.5 |
| 3,888,806 | 6/1975 | Kropscoti | 264/128 |
| 4,028,288 | 6/1977 | Turner | 264/DIG. 69 |
| 4,812,273 | 3/1989 | Bevan | 264/128 |
| 5,106,554 | 4/1992 | Drews | 264/DIG. 69 |

Primary Examiner—Robert A. Dawson
Assistant Examiner—Kenneth M. Jones
Attorney, Agent, or Firm—Harris Beach & Wilcox

[57] ABSTRACT

This invention relates to a molding process that utilizes different kinds of recycled materials to create a nonhomogeneous article. The materials are first granulated or shredded and then loaded into specific volumes within a mold. An uncured liquid thermosetting resin is then injected into the mold to fill the voids between the particles and completely encapsulated to the particles within the resin. The resin is allowed to cure in an unheated and an unpressurized state to form finished articles.

4 Claims, 2 Drawing Sheets

5,453,236

METHOD OF MOLDING A LOAD BEARING PALLET FROM RECYCLED MATERIALS

BACKGROUND OF THE INVENTION

This invention relates to a method of molding articles, and in particular to molding articles from recycled materials. More specifically, this invention relates to a process for molding nonhomogeneous articles from various recycled materials so that the finished article has given areas or volumes that exhibit different mechanical properties.

There is a great need to reuse materials such as thermosetting plastic, rubber and the like in order to avoid many of the environmental problems associated with the disposal of these materials. Some processes such as those disclosed in U.S. Pat. Nos. 5,145,617, 5,075,057, and 5,055,350 have been devised for making articles from used plastics. However, for the most part, these processes are energy dependent in that they require the use of heat and/or pressure to achieve the desired result.

Other processes, such as the process described in U.S. Pat. No. 5,106,880, are dedicated to recycling very specific materials. In the noted patent, cellulose fibers are combined with cellulose starch in the presence of a gas generating agent to form a foam matrix. The foam material produced by this process, while useful, does not possess high tensile or compressive strength.

U.S. Pat. No. 4,443,286 to Ikeda et al. involves a process for manufacturing automobile cushions from polyurethane. Initially, a sheet of polyurethane is placed between a pair of forming dies and the sheet is coated with recycled polyurethane foam chips. The chips are bonded to the sheet using an adhesive while at the same time being compressed between the dies. Here again, the process requires the use of pressure and does not utilize recycled material.

OBJECTS AND SUMMARY OF THE INVENTION

It is therefore a primary object of the present invention to mold recycled materials into useful articles.

It is another object of the present invention to mold articles from used thermoset plastics and other heretofore difficult to recycle materials.

A still further object of the present invention is to provide articles having multiple mechanical properties that are molded from recycled materials.

Another object of the present invention is to provide a method for molding nonhomogeneous articles that does not require the use of heat or pressure.

Yet another object of the present invention is to protect the environment by providing a use for difficult to dispose of materials.

A further object of the present invention is to provide a molded article that is formed of nonhomogeneous particles held together by a continuous thermosetting resin binder.

These and other objects of the present invention are attained by means of a molding process wherein particles of nonhomogeneous materials are loaded into selected volumes within a mold cavity. The particles are of a size and shape such that voids are formed between adjacent particles. A curable thermosetting resin is injected into the mold cavity to fill the voids and encapsulate the particles with the resin. The resin is allowed to cure in an unheated and unpressurized state to form an article having multiple mechanical properties.

BRIEF DESCRIPTION OF THE DRAWINGS

For a better understanding of these and other objects of the present invention, reference will be made below to the following detailed description of the invention which is to be read in association with the following drawings, wherein.

DETAILED DESCRIPTION OF THE INVENTION

Figure 1:
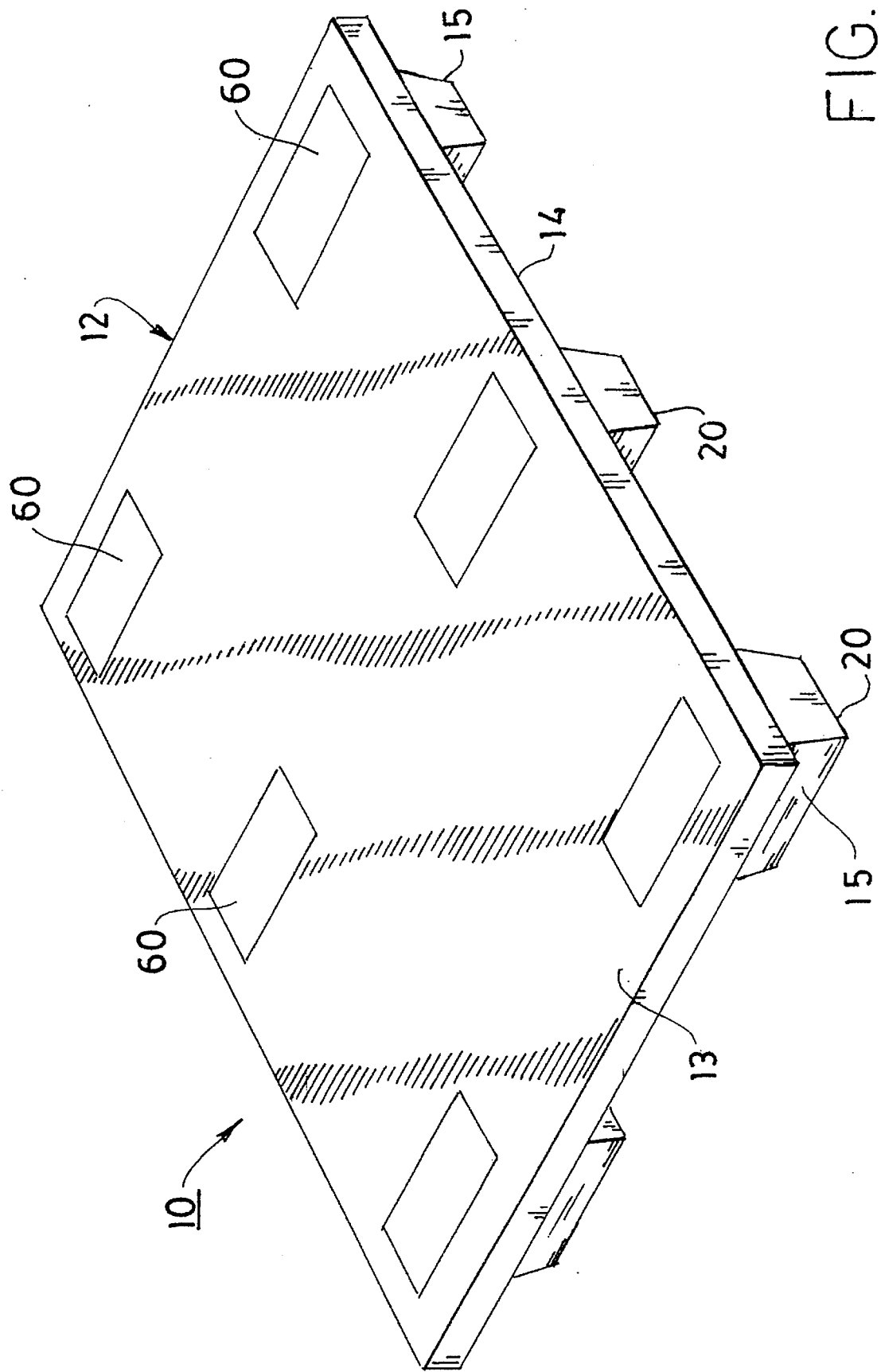
FIG. 1 is a perspective view showing a high strength load bearing pallet that has been fabricated using the method of the present invention.

Referring initially to FIG. 1, there is shown a high strength load bearing pallet 10 manufactured by the molding technique of the present invention. Although the present invention will be described with specific reference to manufacturing a load bearing pallet, it should become evident from the disclosure below that the molding process can be used to fabricate any number of nonhomogeneous articles from various recycled materials which heretofore have been difficult to dispose of or pose a danger to the environment. As will be explained in greater detail below, the materials are first granulated or shredded to produce particles in a general size range of between 1 and 15 mm. Preferably, the particles are irregular in size and shape.

Particles of a specific material are placed in selected volumes within a mold cavity. Because of the irregular size and shape of the particles, voids are provided between the adjacent particles. A liquid thermosetting resin is then injected into the mold to fill the voids between the particles and to completely encapsulate the particulate materials within the resin binder. The resin is allowed to set or cure in the mold, whereupon the nonhomogeneous volumes are bonded together by a continuous binder of thermosetting resin.

As can be seen, wide control can be maintained over the interior and the exterior structure of the molded article by proper selection of appropriate recycled materials to fill selected volumes within these regions. One volume may contain a material having high compressive and/or tensile strength while another volume might contain a relatively weaker, but light material. One-piece molded parts might thus be formed having a first strong and rigid section which is bonded by the resin binder to a second softer or more flexible adjacent section. Light weight cores of recycled foamed plastic may also be placed inside other volumes to lighten the structure without appreciably weakening the article. As can be seen by subdividing the article into a number of functionally different volumes, a product can be fabricated in one molding operation which exhibits a number of different mechanical properties.

Turning again to FIG. 1, pallet 10 includes a rectangular shaped load bearing platform 12 having a flat top surface 13 and an opposed flat bottom surface 14. A series of tapered legs 15—15 depend from the bottom surface of the platform. The legs all terminate in a contact surface 20 with the contact surfaces all lying in a common plane whereby the pallet may be supported on a horizontal substrate or floor.

Figure 2:
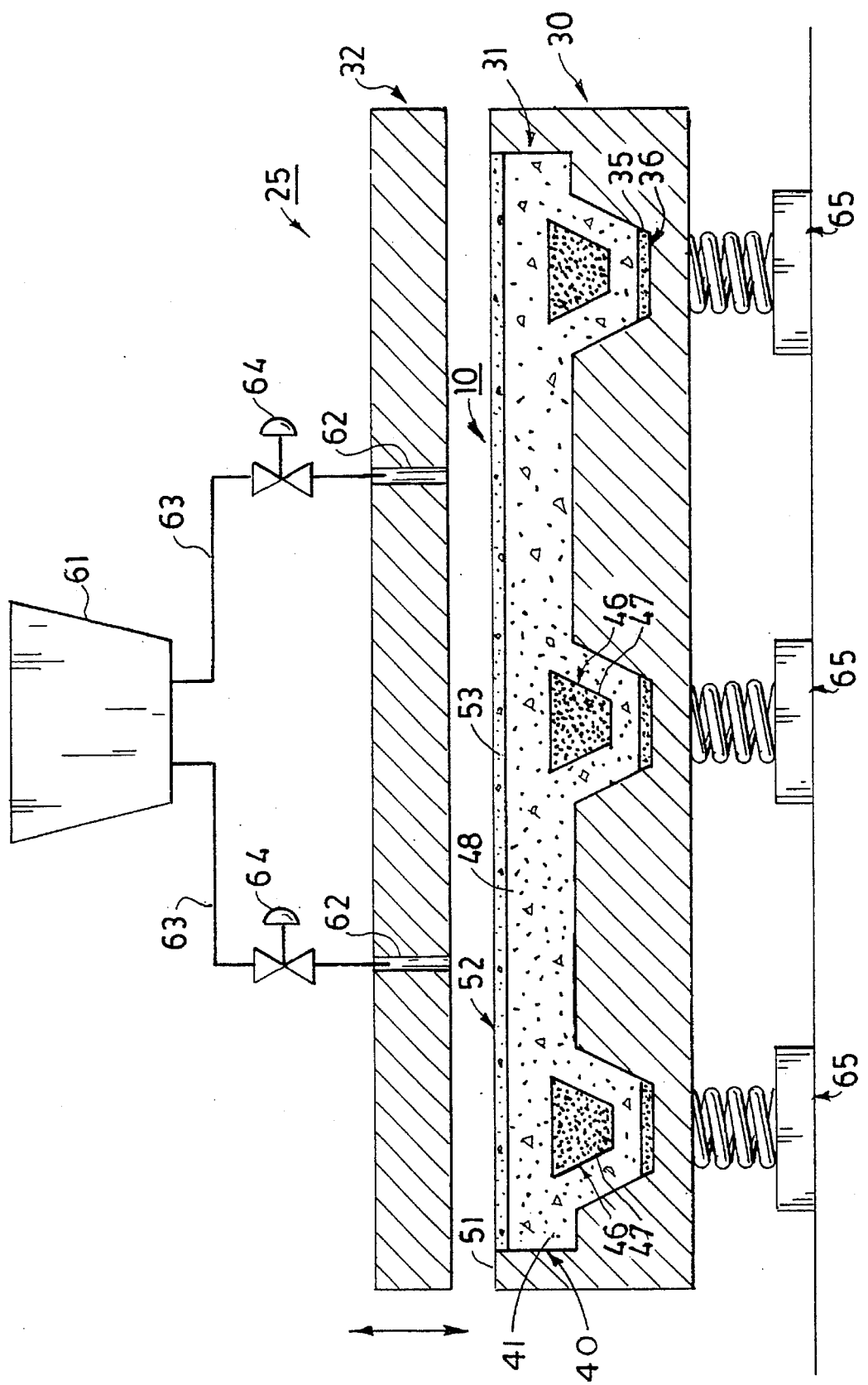
FIG. 2 is a side elevation showing a two-piece mold used to fabricate the pallet shown in FIG. 1.

The pallet is molded in a single operation using a two-piece mold generally referenced 25 (FIG. 2). The mold includes a lower body section 30 containing a hollow molding cavity 31 that depicts the outline of the pallet shown in FIG. 1. A top cover section 32 is positioned over the body section and is adapted to be raised and lowered as indicated by the arrows to open and close the mold cavity.

As noted above, the pallet is molded entirely from recycled materials that have been granulated or shredded to form random shaped particles, each having a particle size of about between 1 and 15 mm. As illustrated, the pallet is subdivided into a number of individual and separate volumes, each of which houses a different recycled material. The materials are selected for their specific properties and are strategically located within the pallet to carry out a desired function relating to the structure.

Initially, a first particulate material 35, having a high abrasion strength, is loaded into a first volume 36 located in the lower part of the mold cavity describing the pallet legs. The first material forms contact pads for the pallet that will resist scraping and abrading in this area. This material may be formulated from recycled glass, cinders, cinder and concrete blocks, or the like. Over the first volume 36, there is laid a second volume 40 containing shredded recycled thermosetting plastic particles 41 or any other material exhibiting high compressive or tensile strength. Glass or carbon fiber or metal chips can be added to provide additional strength to the volume. This second volume 40 forms the backbone of the pallet that is capable of supporting a load placed upon the platform. The second volume is initially raised to a desired intermediate level and at preselected locations, a third volume 46 is created by filling the locations with light weight foamed plastic particles 47 preferably fabricated from shredded polyurethane, styrene, cellulose, wood chips, or the like. The third volume is then completely covered by the thermosetting particles and the second volume raised to a desired level below the top surface 51 of the mold housing.

Finally, granulated rubber 53 from used automotive tires, or a similar material having a high coefficient of friction, is poured into a fourth volume 52 over the thermosetting plastic particles making up the second volume. The fourth volume is then filled with the granulated rubber to a level to completely fill the mold. The mold cover is then brought to a closed position thus closing the mold cavity. Alternatively, as illustrated in FIG. 1, the rubber particles may be laid down in stripes 60—60, rather then in a continuous layer, to provide friction pads along the top surface of the platform 12.

A supply reservoir 61 is mounted over the mold cover and is arranged to hold a quantity of uncured liquid thermosetting resin such as a liquid polyurethane or a polyester/urethane hybrid blend. A number of supply ports 62—62 are provided in the mold cover and are connected to the reservoir by supply lines 63—63. Valves 64—64 are also provided to control the flow of resin into the mold cavity. With the mold cover closed, liquid resin is injected into the mold cavity to completely fill the voids between the particulate materials and to completely fill the cavity, thus encapsulating the particles within the resin.

The mold housing 30 is supported upon a series of vibratory stands 65—65 that oscillate the mold to homogeneously distribute both the particulate material and the liquid resin throughout the mold cavity. The resin is then permitted to cure or set within the mold in an unheated and unpressurized state. After the liquid has cured, the pallet is removed from the mold cavity and the mold readied for reuse.

It should be evident from the disclosure above that the present process is ideally suited for use in fabricating any number of articles from hard to dispose of materials. The process permits the user to select and specify what materials are to be used to satisfy specific engineering properties required of the finished article. As noted above, distinct volumes, both at the exterior surfaces and within the interior structure of the article can be filled with particular materials to furnish the part having a multitude of properties. Because the parent resin is impregnated throughout the entire structure, all the volumes are integrally connected, thus yielding a structurally sound part. In short, the part can be technically subdivided into functional volumes and specific recycled materials preferentially placed in the volumes to provide the article with different mechanical properties at predetermined locations along exterior surfaces of the part as well as regions within the interior of the part.

While this invention has been explained with reference to the structure disclosed herein, it is not confined to the details set forth and this invention is intended to cover any modifications and changes as may come within the scope of the following claims:

What is claimed is:

1. A method of molding a load bearing pallet from recycled materials that includes the steps of providing a mold having a cavity depicting a pallet containing a flat load bearing platform with top and bottom surfaces and a plurality of legs depending from the bottom surface of the platform, said legs further including lower contact surfaces that lie in a common plane, loading granulated particles of recycled materials into a plurality of selected volumes within the cavity, said particles being sized and shaped to provide voids therebetween, said recycled materials each exhibiting a different mechanical property with regard to said other particles, wherein a first material containing particulate material having a high abrasion strength is loaded into a first volume describing the pallet legs, and a second material containing recycled thermosetting plastic particles is loaded into a second volume located between the first volume and the top surface of the platform describing the backbone of the pallet, filling the cavity with a thermosetting resin to fill the voids between particles and encapsulate the particles within the resin, and allowing the resin to cure in an unheated and unpressurized state to form a nonhomogeneous article having a continuous resin binder.

2. The method of claim 1 that includes the further step of loading a third recycled material having a high coefficient of friction into a third volume located on top of the second volume describing the top surface of the platform.

3. The method of claim 2 that includes the further step of adding glass fibers to said second material to provide additional strength to said pallet.

4. The method of claim 3 that further includes the step of loading a fourth lightweight material into a fourth volume, said fourth volume being surrounded by said second volume.

* * * * *